E. H. BAXTER.
TRANSMISSION LOCK.
APPLICATION FILED JAN. 2, 1920.

1,355,380.

Patented Oct. 12, 1920.
2 SHEETS—SHEET 1.

Inventor
Ernest H. Baxter.

By

Attorneys

E. H. BAXTER.
TRANSMISSION LOCK.
APPLICATION FILED JAN. 2, 1920.
1,355,380.
Patented Oct. 12, 1920.
2 SHEETS—SHEET 2.
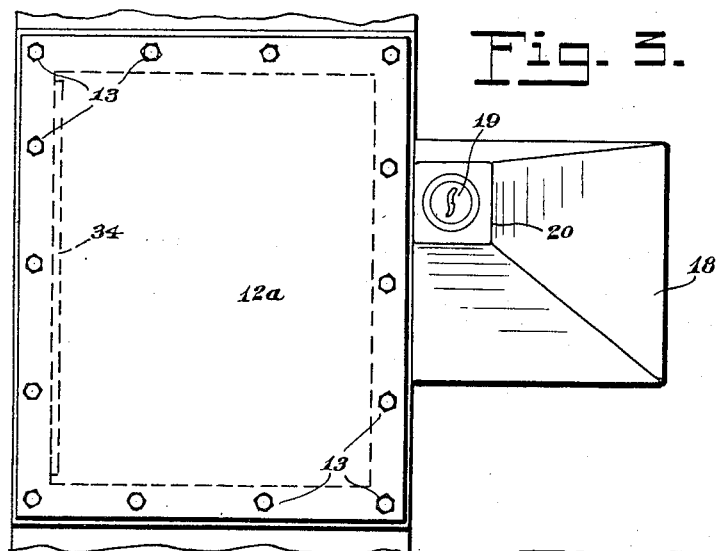
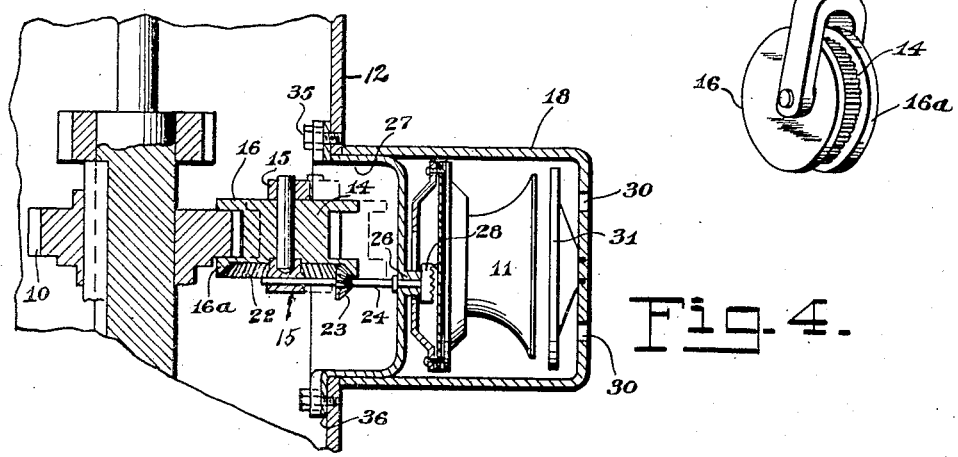
INVENTOR.
Ernest H. Baxter.
BY
ATTORNEYS.

UNITED STATES PATENT OFFICE.

ERNEST H. BAXTER, OF CHICAGO, ILLINOIS.

TRANSMISSION-LOCK.

1,355,380.  Specification of Letters Patent.  Patented Oct. 12, 1920.

Application filed January 2, 1920. Serial No. 348,742.

*To all whom it may concern:*

Be it known that I, ERNEST H. BAXTER, a citizen of the United States, residing at Chicago, in the county of Cook and State of Illinois, have invented new and useful Improvements in Transmission-Locks, of which the following is a specification.

This invention relates to devices for preventing the theft or unauthorized use of automobiles and other motor vehicles, and more particularly a device which accomplishes the purpose by locking the transmission gears.

The invention has for its object to provide a simple and efficient locking mechanism of the kind stated which prevents the transmission gears from being shifted from the disconnected or "neutral" position, and which also embodies an alarm device which is sounded if an attempt is made to tow the car while the transmission gears are locked as mentioned.

The object stated is attained by means of a novel combination and arrangement of parts to be hereinafter described and claimed, and in order that the same may be better understood, reference is had to the accompanying drawings forming a part of this specification.

Figure 1:
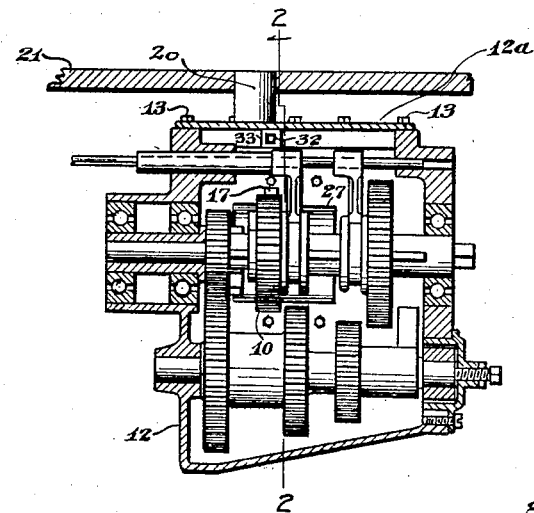
Figure 2:
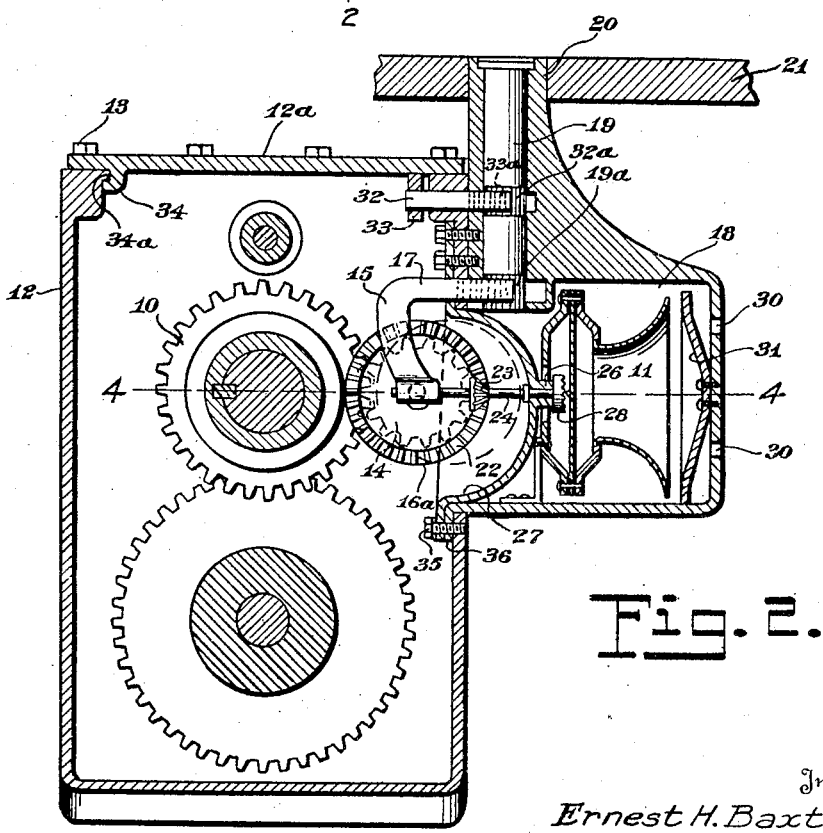

In the drawings Figure 1 is an elevation showing the application of the invention, with parts in section; Fig. 2 is an enlarged cross section on the line 2—2 of Fig. 1; Fig. 3 is a plan view of the transmission housing; Fig. 4 is a horizontal section on the line 4—4 of Fig. 2, and Fig. 5 is a detail in perspective.

Referring specifically to the drawings, 10 denotes the high speed gear of a transmission gear set of standard design, said gear being movable to the left in Fig. 1 for the "high" speed drive, and to the right for the "second" speed drive. A lock is provided for preventing this movement of the gear 10, and a mechanism for sounding an audible alarm device 11 is thrown into gear when the locking action is effected, so that said device is sounded if an attempt is made to tow the car, the alarm device being actuated by a mechanism obtaining motion from the gear 10 as it is rotated when the car is driven from the rear wheels, as when towed. The housing 12 inclosing the gear-set has a cover 12ª which is bolted on as shown at 13, and is also provided with a lock so that said cover cannot be removed, thereby preventing access to the gear-set.

The lock for the gear 10 comprises the following parts:

An auxiliary gear 14 is hung back of the gear 10 in a forked hanger 15, said gear 14 having outstanding marginal flanges 16 and 16ª, respectively, between which the gear 10 seats when the gear 14 is brought in mesh with the gear 10. The hanger 15 is formed at the top with a horizontal rack bar 17 which passes through the wall of the housing 12 into a lock casing 18, in neck 20 of the latter being mounted a lock having a rotatable key-operated barrel or cylinder 19. The neck 20 rises through the floor board 21 of the car for access to the lock by the key thereof. Where the gear set is so located that it cannot be reached from the floor of the front compartment of the car, the floor of the car above the gear-set can be provided with a small trap door to permit ready access to the lock.

The rotatable lock barrel 19 has a pinion 19ª which is in mesh with the rack 17 so that the latter may be shifted to advance the gear 14 toward the gear 10 as shown in full lines in Fig. 4. The gear 10 now seats between the flanges 16 and 16ª, and hence it cannot be shifted. To release the gear 10 it is necessary only to operate the barrel 19 in a direction to retract the rack 17.

The flange 16ª of gear 14 has internal bevel gear teeth 22 adapted to mesh with a bevel pinion 23 on a shaft 24 having one end supported by one arm of the hanger 15, and its other end by a bearing 26 on a cup 27 in the lock casing 18, the latter being mounted over an opening in the housing 12, and the cup forming a closure for the inner end of the lock casing to prevent the oil in the housing 12 from splashing thereinto. On the pinion shaft 24 is the toothed actuator 28 of the alarm device, the latter being a standard auto horn of the vibrating diaphragm type.

It will be evident from the foregoing that when the gear 10 is rotated, due to the car being towed, the device 28 is actuated to sound the horn 11, the motion of the gear 10 being transmitted to the shaft 24 of said device through the gear 14, 22 and 23. The sound escapes through holes 30 in the outer end wall of the casing 18, back of which is mounted a guard plate 31 to prevent the insertion of a device for interfering with the sounding of the alarm device.

The operation of the lock barrel 19 to retract the gear 14 out of mesh with gear 10 will also carry the gear teeth 22 out of mesh with the pinion 23, and thus throw the alarm device out of gear.

The cover 12ª has, inside the housing 12, a keeper 33 for a slidable bolt 32 operated by the lock barrel 19, the latter having a pinion 32ª meshing with rack teeth 33ª on the bolt. The cover plate 12ª also has a bottom flange 34 adjacent to its edge opposite the locked edge, said flange seating under a rib 34ª on the side wall of the housing 12 at the top thereof, which prevents removal of the cover plate until the bolt 32 has been retracted.

The lock casing 18 is bolted on from the inside of the housing 12 to prevent it being tampered with, the bolts 35 also holding the cup 27. The casing also has a marginal flange 36 assisting to hold it in place.

The device will also prevent action on the part of the low and reverse speed gears, for the reason that the act of locking the high speed gear in "neutral," also locks the hand-operated shift lever in that position, preventing the same from being swung sidewise to operate the slide bar for the low and reverse speed gears.

I claim:

1. The combination with a motor vehicle transmission mechanism having a shiftable gear, of lock-controlled means for holding said gear from being shifted, and an alarm device actuated by said gear when so held.

2. The combination with a motor vehicle transmission having a shiftable gear, of a pinion movable into and out of mesh with said gear, said pinion having outstanding flanges between which the gear seats when in mesh with the pinion, lock-controlled means for shifting the pinion into and out of mesh with the gear, and an alarm device actuated by said pinion when it is in mesh with the gear.

3. The combination with a motor vehicle transmission having a shiftable gear, of a pinion movable into and out of mesh with said gear, said pinion having outstanding flanges between which the gear seats when in mesh with the pinion, lock-controlled means for shifting the pinion into and out of mesh with the gear, an alarm device, an actuator for the alarm device, a shaft for operating the actuator, and a gearing between the shaft and the aforesaid pinion, which gearing is in mesh when the pinion is in mesh with the aforesaid gear.

4. The combination with a motor vehicle transmission mechanism having a shiftable gear, of lock controlled means for holding said gear from being shifted, an alarm device actuated by said gear when so held, a housing inclosing the mechanism, a door for said housing, and a locking device for the door controlled by the lock of the gear holding means.

In testimony whereof I affix my signature.

ERNEST H. BAXTER.